(12) United States Patent
Sharma et al.

(10) Patent No.: US 9,722,723 B2
(45) Date of Patent: Aug. 1, 2017

(54) DYNAMIC HITLESS ODUFLEX RESIZING IN OPTICAL TRANSPORT NETWORKS

(71) Applicant: Tejas Networks Limited, Bangalore (IN)

(72) Inventors: Nishant Sharma, Bangalore (IN); Nikhil Kumar Satyarthi, Bangalore (IN)

(73) Assignee: TEJAS NETWORKS LTD., Bangalore, Karnataka (IN)

( * ) Notice: Subject to any disclaimer, the term of this patent is extended or adjusted under 35 U.S.C. 154(b) by 0 days.

(21) Appl. No.: 14/025,924

(22) Filed: Sep. 13, 2013

(65) Prior Publication Data

US 2014/0079402 A1    Mar. 20, 2014

(30) Foreign Application Priority Data

Sep. 13, 2012  (IN) .......................... 3791/CHE/2012

(51) Int. Cl.
*H04J 14/08*      (2006.01)
*H04J 3/16*       (2006.01)

(52) U.S. Cl.
CPC ............ *H04J 14/08* (2013.01); *H04J 3/1652* (2013.01)

(58) Field of Classification Search
CPC .... H04J 14/0273; H04J 14/0288; H04J 14/08; H04Q 11/0005
See application file for complete search history.

(56) References Cited

U.S. PATENT DOCUMENTS

| 2012/0163812 A1* | 6/2012 | Youn et al. ...................... 398/45 |
| 2012/0170936 A1* | 7/2012 | Vissers et al. .................. 398/58 |
| 2013/0279904 A1* | 10/2013 | Tang et al. ....................... 398/25 |
| 2014/0119733 A1* | 5/2014 | Shimizu et al. ................ 398/98 |

* cited by examiner

*Primary Examiner* — Dzung Tran
(74) *Attorney, Agent, or Firm* — Prakash Nama; Global IP Services, PLLC

(57) ABSTRACT

The present invention and its embodiments are made to provide for dynamic hitless resizing in optical transport network without any identification of matching time slots by the Network Management System (NMS) or any control plane signaling including Generalised Multi Protocol Label Switching (GMPLS). An aspect of the invention provides for a method of hitless ODUflex connection resizing in an optical transport network by incrementing or decrementing the ODUflex connection between the nodes, based on an indication command given to a source node for bandwidth increase or decrease, by identifying and matching at least one time slot through Link Connection Resizing (LCR) protocol message exchanges. Another aspect of the invention provides for a method of hitless ODUflex connection resizing in an optical transport network by decrementing the matching time slot used for the incrementing operation, in case of unsuccessful incrementing operation between nodes.

4 Claims, 11 Drawing Sheets

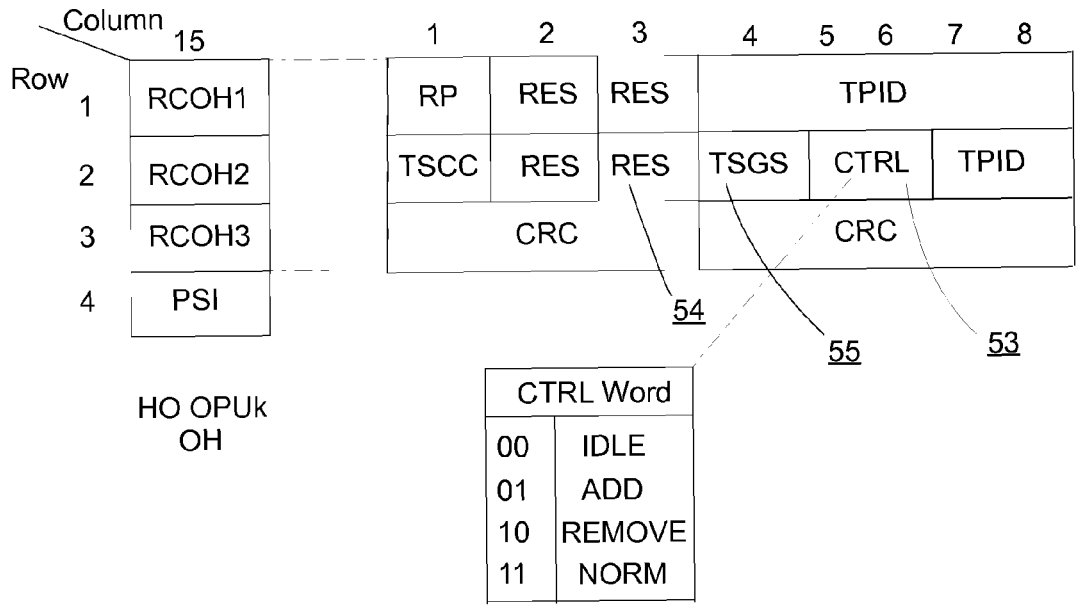
FIGURE 9: Prior Art-2 bit CTRL word
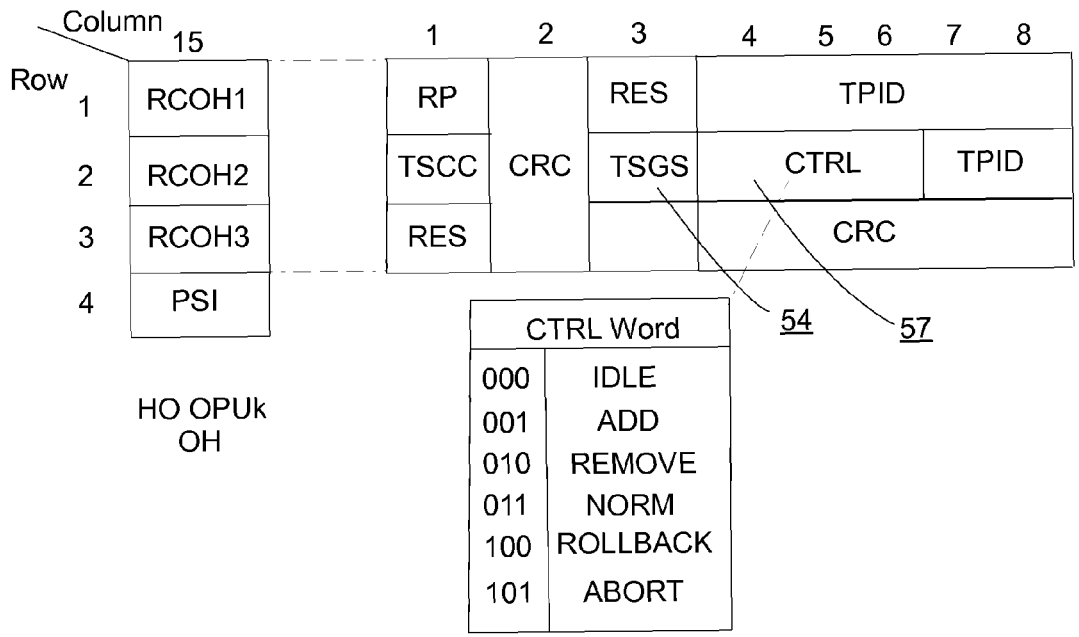
FIGURE 10

DYNAMIC HITLESS ODUFLEX RESIZING IN OPTICAL TRANSPORT NETWORKS

FIELD OF THE INVENTION

The present invention relates to dynamic hitless ODUflex resizing in optical transport networks.

TECHNICAL BACKGROUND

In the emerging telecommunications environment, optical transport network (OTN) are employed to achieve large capacity of data transmissions at the rates of 1 Giga bits/sec., up to 100 Giga bits/sec., by flexible scheduling of bandwidth without disrupting the continuous data flow, which can be achieved based on optical transmission technologies like Hitless Adjustment of ODUflex (Generic Framing Procedure) (HAO). The HAO as per ITU-T G. 7044 describes the mechanism for bandwidth increase or decrease for an ODUflex (GFP) end to end circuit. The process of increasing or decreasing the bandwidth in a hitless manner involves signalling in two parts consisting of Link Connection Resizing (LCR) and Bandwidth Resizing (BWR), done by signalling protocols viz. LCR protocol and BWR protocol between the Nodes carrying the ODUflex circuit end to end.

A packet client is mapped to an ODUflex via GFP and carried over in an OTN network. Based on client service requirements the ODUflex needs different bandwidth to meet different data flow adjustments. The required increase or decrease in bandwidth is sensed, and a management plane entity (for e.g., network management system) or a control plane entity, (for e.g., Generalised Multi-Protocol Label Switching) commands each of the Nodes in the network to increase or decrease the bandwidth. The command essentially consists of agreed time-slots on each of the nodes where the increased or decreased data flow is to be adjusted. The list of time-slots on which the increase or decrease is to be done is deduced by the management or control plane which has a complete network view.

Since OTN is a circuit switched time-division multiplexed technology, an agreement has to be done between the nodes on the time-slots on which the ODUflex is carried. When a circuit is made, both the transmit and receive ends have to agree on the same list of time-slots which the ODUflex occupies within a higher order ODU (optical channel data unit). In case of bandwidth increase, the LCR protocol involves handshaking between the two nodes on a list of additional time-slots which are proposed for bandwidth increase. The LCR protocol involves coordination between the transmit and receive ends for the resizing operation on these additional time-slots.

The problem with the existing ODUflex bandwidth adjustment technology is that the LCR protocol for ODUflex bandwidth increase or decrease does not identify the time-slots on the connection link between the nodes and these time-slots on which the bandwidth increase or decrease is to be done are decided externally by the management or control plane. Also, in case of network management system (NMS) or control plane signaling (GMPLS) failure the ODUflex resizing is affected. The need for a management plane or control plane entity is necessary for the existing resizing operation as they have the full network view so that they can decide on the matching time-slots at the transmit and receive nodes.

Further the network management system or control plane stack is often associated with a cost. The HAO system has to be integrated with such a stack which requires effort, man power, system resources in terms of CPU/Memory/Power etc. Additionally in control plane signalling a dedicated in-band or out-band communication channel is required thereby resulting in wastage of resources. Therefore a hitless ODUflex resizing method is required which is managed without network management system or control plane signalling including Generalised Multi-Protocol Label Switching (GMPLS).

SUMMARY OF THE INVENTION

The summary represents the simplified condensed version of the claimed subject matter and it is not an extensive disclosure of the claimed subject matter. The summary neither identifies key or critical elements nor delineates the scope of the claimed subject matter. The summary presents the simplified form of the claimed subject matter and acts as a prelude to the detailed description that is given below.

The present invention and its embodiments are made to provide for dynamic hitless resizing in optical transport network without any identification of matching time slots by the Network Management System (NMS) or any control plane signaling including Generalised Multi Protocol Label Switching (GMPLS).

An aspect of the invention provides for a method of hitless ODUflex connection resizing in an optical transport network by incrementing or decrementing the ODUflex connection between the nodes, based on an indication command given to a source node for bandwidth increase or decrease, by identifying and matching at least one time slot through Link Connection Resizing (LCR) protocol message exchanges.

Another aspect of the invention provides for a method of hitless ODUflex connection resizing in an optical transport network by decrementing the matching time slot used for the incrementing operation, through Link Connection Resizing (LCR) protocol message exchanges, in case of unsuccessful incrementing operation between nodes.

DESCRIPTION OF THE DRAWINGS

The features, advantages and other aspects of the embodiments of the present invention will be obvious to any person skilled in the art to appreciate the invention when read with the following description taken in conjunction with the accompanying drawings.

FIG. 9 shows the bit format for HAO Control (CTRL) words known in the prior art.

FIG. 10 shows the bit format for the enhanced protocol command messages (PCM) in accordance with the embodiments of the invention.

The figures are not drawn to scale and are illustrated for simplicity and clarity to help understand the various embodiments of the present invention. Throughout the drawings it should be noted that like reference numbers are used to depict the same or similar elements, features and structures.

DETAILED DESCRIPTION

Figure 1:
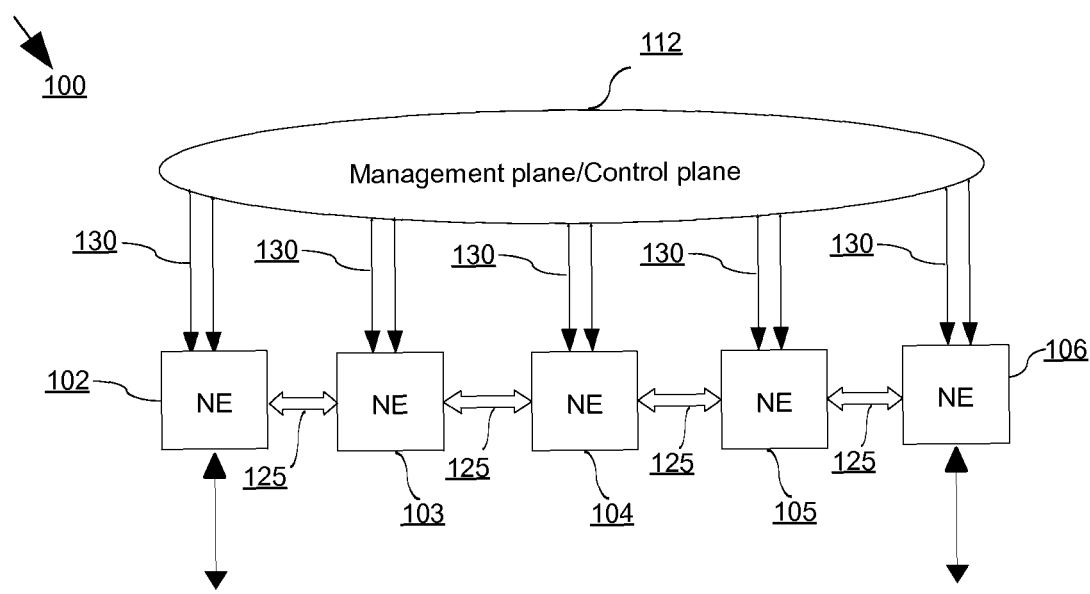
FIG. 1 illustrates an optical transport network structure as known in the prior art.

The following descriptions with reference to the accompanying drawings are provided to assist in a comprehensive understanding of exemplary embodiments of the invention as defined by the claims and their equivalents. Accordingly, those of ordinary skill in the art will recognize that various changes and modifications of the embodiments described herein can be made without departing from the scope and spirit of the invention.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

In the figures certain embodiments are shown in block diagrams in order to facilitate describing those embodiments. The terms, component, module, system, and the like are intended to refer to an entity or entities within a communication network node comprising of; hardware, software, a combination of hardware and software. For e.g., a component may be, but not limited to being, a process running on a processor, a processor, an integrated circuit, or a computer. Both an application running on a computing device and the computing device can be a component. A component may be localized on one computer and/or distributed between two or more computers. The components may communicate by way of local and/or remote processes.

The present invention and its embodiments are mainly described in relation to ITU-T G.7044 specifications and standards for applicability of certain exemplary embodiments. The terminology used is therefore related thereto. Such terminology is used in the context of describing the embodiments of the invention and it does not limit the invention in any way. Any other network architecture or system deployment, etc., may also be utilized as long as it is compliant with the features described herein.

In particular, embodiments of the present invention may be applicable in any HAO (GFP) communication network with a need for functioning without any matching time slot (MTS) identification done by a Network Management System (NMS) or any Control Plane Signaling including GMPLS for hitless link connection resizing (LCR). Embodiments of the invention may also be applicable in HAO (GFP) communication network enabled by a NMS or GMPLS as a backup in case of NMS or GMPLS failing in LCR resizing. Embodiments of the present invention may be applicable for/in any kind of modern and future communication in an optical transport network.

Node used in the following description denotes a communication entity in an optical transport network, used by various terminologies like a network node, routers, network device, network terminal, network element (NE) etc. Network, communication network, optical transport networks used in the description refers to Hitless Adjustment of ODUflex (Generic Framing Procedure) [HAO (GFP)] communication applicable in optical transport networks (OTN). End, ends, end points functioning in master mode or slave mode, refer to individual port or ports, providing access to the services offered by a node.

FIG. 1 illustrates an optical transport network structure known in the prior art. The optical transport network 100 comprises of nodes 102, 103, 104, 105 and 106. Between the pairs of nodes ODUflex connection link 125 extends over the network 100. With respect to the ODUflex connection 125, node 102 is the Source node, where client packet signal is added or dropped to be transported to the Destination Node 106 over the Intermediate Nodes 103, 104 and 105. The entire nodes in the network 100 are managed by a Network Management Entity 112 commonly referred to as network management system (NMS), which may be a Computer Controlled system, a management server, or Generalized Multi-Protocol Label Switching (GMPLS) based control plane etc., having the control over the resources of all the nodes within that network. The Hitless Adjustment of ODUflex as per ITU-T G. 7044 describes the mechanism for bandwidth increase or decrease for an ODUflex (GFP) end to end circuit. Depending on client requirements, data flow in the network may either increase or decrease. The NMS or GMPLS having all the resources of the nodes in a network deduces the appropriate matching time-slots (MTS) between the nodes on which the data flow is to be increased or decreased and simultaneously issues command 130 to all the nodes to carry out link connection resizing.

Figure 2:
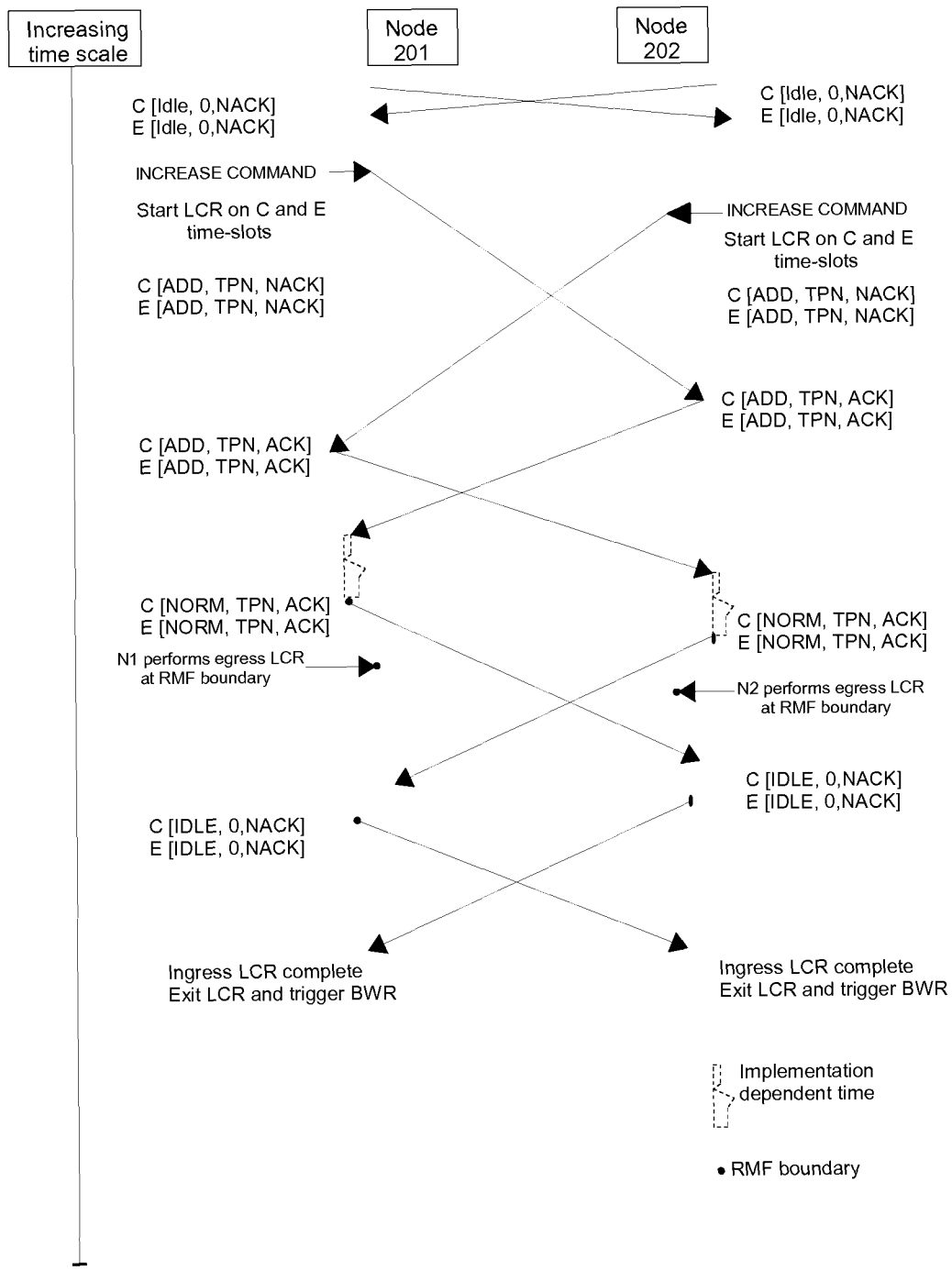
FIG. 2 illustrates a link connection resizing (LCR) procedure known in the prior art.

FIG. 2 illustrates an existing link connection resizing procedure known in the prior art. For the purposes of illustration and clarity a link connection resizing between two nodes (201 and 201) are shown. Based on a packet client added or dropped at an end node, the NMS/GMPLS sense a bandwidth increase in the network and simultaneously identifies the matching time-slots required for the increase in bandwidth. On assumption that the network requires two time-slots for the increase in bandwidth, the NMS/GMPLS having access over the resources of each node in the network figures out two matching time-slots (for e.g., C and E) for increase operation in the link connection between the nodes 201 and 201. Since it has been pre-determined by the NMS/GMPLS that C and E are the time-slots which are in agreement on the nodes 201 and 201, it issues an increase command simultaneously to both the nodes 201 and 201. As the matching time slots are deduced by the NMS/GMPLS, the LCR protocol, upon mutual acknowledgment using protocol messages performs the link connection resizing at the next Resize Multi Frame (RMF) boundary. This marks the end of LCR protocol and the initiation of bandwidth resizing (BWR) protocol.

Figure 3:
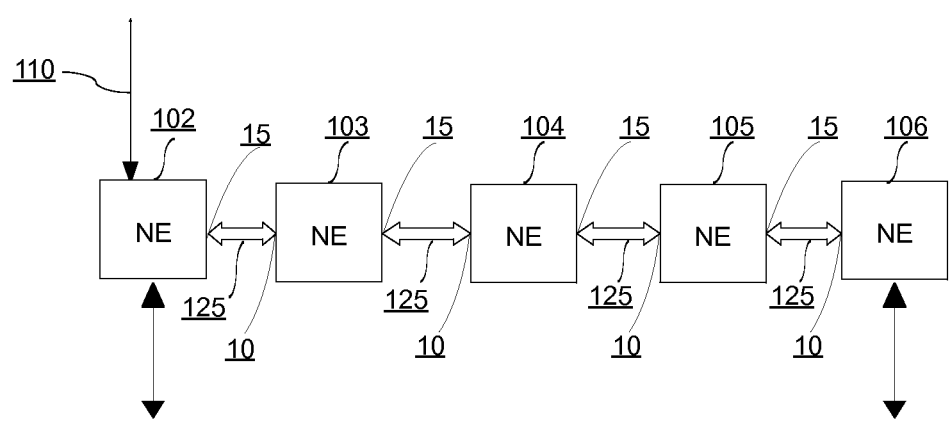
FIG. 3 illustrates an optical transport network structure in accordance with the principles of the invention.

FIG. 3 shows a logical path for data transport in an optical transport network 200 in accordance with the principles of the invention. Between the pairs of nodes 102, 103, 104, 105 and 106, ODUflex connection link 125 extend over the nodes 102 to 106. With respect to the ODUflex connection 125, node 102 is the Source node, where client packet signal is added or dropped to be transported to the Destination Node 106 over the Intermediate Nodes 103, 104, 105. Indication command 110 to increase or decrease the bandwidth may be given only to the end nodes (for e.g., 102 or 106) in an ODUflex circuit where packet client is added or dropped. In the network 200, there may be an ODUflex circuit where packet client is added or dropped at node 103 to a destination node for e.g., 105 (not shown in FIG. 3). In such case, the indication command 110 to increase or decrease the bandwidth may be given to the node 103, which consequentially becomes the source node. Depending on the path for data transmission over a network, when a packet client is added or dropped at node 105 to a destination node (for e.g., 103), node 105 may be given the indication command to increase or decrease the bandwidth which consequentially becomes the source node. The illustrated network 200 may also serve to be an actual path for data transport from a source to a destination node.

The entire nodes in the network 200 may or may not be managed by a centralized Network Management Entity normally referred to as Network Management System, including a Computer Controlled system, a management server, or by a GMPLS based control plane etc. Exemplary embodiments provide for each Node within the network 200 is intelligent to communicate with any protocol message exchange for signal transmission and data communication enabling any communication network to have access over its resources. The indication command to increase or decrease the bandwidth may be done manually by a network operator or may be done automatically by a mechanism which senses the bandwidth requirements at the packet client source. The mechanism which senses the bandwidth requirements may be a centralized Network Management Entity, a Computer controlled system, a network management server, GMPLS etc. It is to be noted that the indication command to increase or decrease the bandwidth between the nodes carrying the ODUflex circuit end to end is given to a specific node, unlike an NMS/GMPLS command issued to all the nodes carrying the ODUflex circuit end to end in a network.

Embodiments of the invention provide for a node, which receives an indication command for bandwidth increase or decrease functions as a source node and the node where the increased or decreased data to be transported on the increased or decreased bandwidth functions as a destination node. The nodes in between the source node and the destination node function as intermediate nodes. It is to be understood that between a source node and the destination node there may be multiple nodes functioning as intermediate nodes, or a single node functioning as an intermediate node. In certain circumstances, a source node and a destination node may itself comprise an ODUflex circuit. In most cases, ODUflex connection resizing is performed from a source node to the destination node via intermediate nodes. Therefore references to intermediate nodes may also include a single intermediate node.

Figure 4:
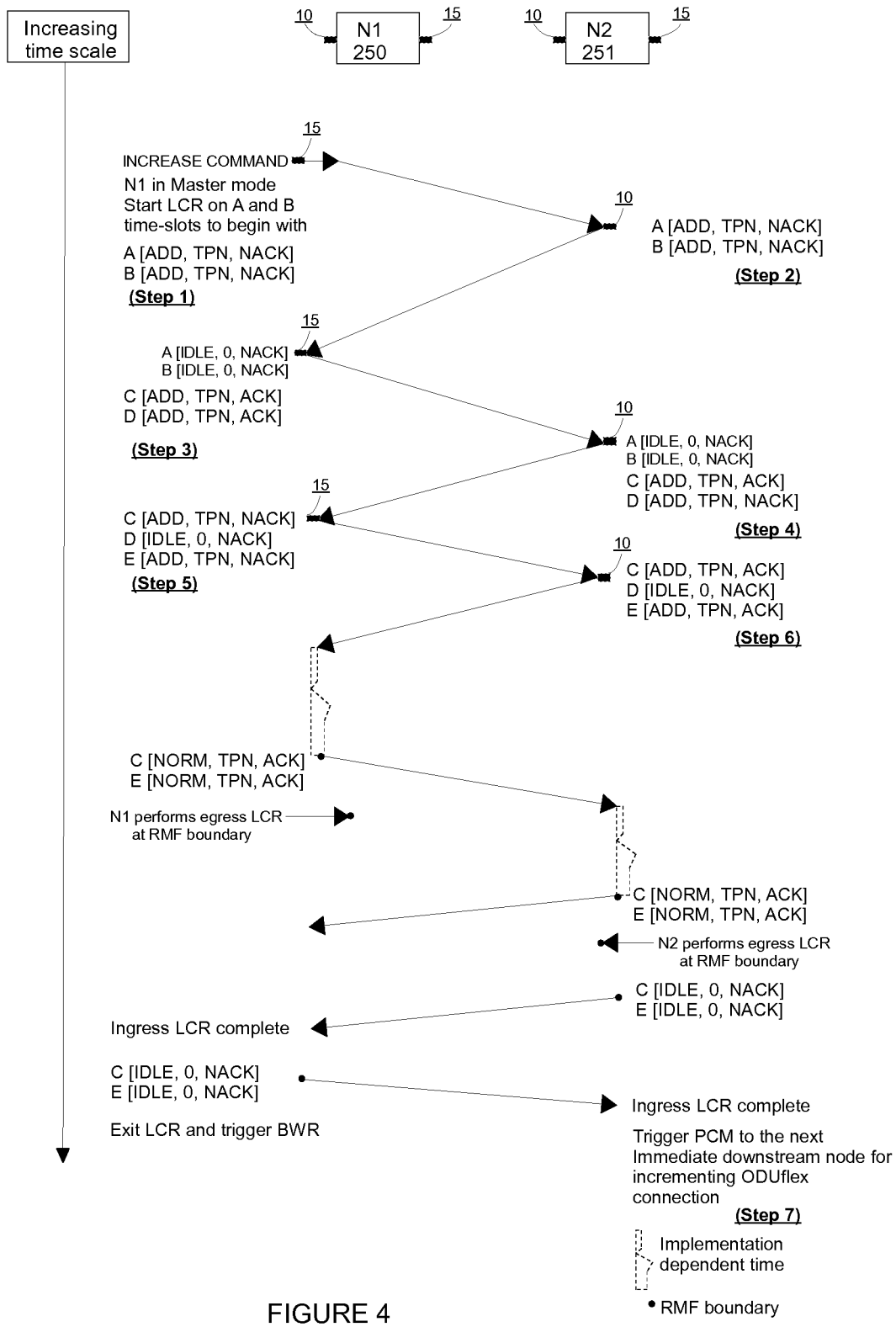
FIG. 4 shows exchange of protocol command messages (PCM) incrementing the connection link between the nodes in an ODUflex connection, in accordance with the embodiments of the invention.

When an indication command 110 for bandwidth increase or decrease is issued to a node 102, the end point 15 of the node 102, in the downstream direction, functions in a master mode for generating and sending protocol command message (PCM) to its next immediate downstream node 103. The node 103 receives the protocol command message from its immediate upstream node 102 at its end point 10 functioning in slave mode. One end point of each node function in master mode 15 and the other end point function in slave mode 10. As illustrated, node 106 is the destination node where the packet client signal is to be transported FIG. 4 illustrates ODUflex connection resizing by incrementing the connection link between the nodes carrying the ODUflex circuit end to end in a network, in accordance with the embodiments of the invention. For the purposes of illustration and clarity a link connection resizing between two nodes 250 and 251 is shown. Node 251 is the immediate downstream node to node 250 and node 250 is the immediate upstream node to node 251. Based on a packet client added or dropped at an end node, the mechanism sensing a bandwidth increase or decrease in the network issues an indication command to only one end node (for e.g., 250) where the packet client is added or dropped. As an example, if the network requires two time-slots for the increase in bandwidth due to the addition of packet client at the source node 250, let us assume that on node 250 time-slots A, B, C, D, E (assuming increasing numerical order) are free for additional bandwidth expansion, but on node 251 time-slot A, B, D are not free and only C and E are free. Without any resizing active in the network, the end points 10 and 15 of the nodes 250 and 251 both function in the slave mode and for the list of free time-slots for e.g., A, B, C, D, E on the increasing time scale, the node 250 sends protocol messages [IDLE, 0, NACK].

When an indication command to increment the bandwidth is issued to the node 250, the node 250 receiving the indication command to increment the bandwidth becomes the source node with its end point 15 functioning in the master mode. Source node 250, from its end point 15, generates a protocol command message (PCM) for demanding the matching time slot (MTS) required for the incrementing operation, to its next immediate downstream Node 251. Exemplary embodiments provide for enhanced LCR protocol message exchanges by which, availability of matching time slots (MTS) are deduced between the nodes.

An illustration of enhanced protocol message exchange embodying the principles of the invention is shown below for illustrating how the nodes deduce the available matching time-slots. The node 250 from its end point 15, functioning in the master mode, generates and sends a protocol command message to add the matching time-slot A and B available at its end, for increasing the connection size to accommodate the increased bandwidth, based on the received 'Indication Command' (Step 1). Node 251 receives the protocol command message at its end point 10 functioning in the slave mode. If the demanded time-slots A and B are available at the node 251, an acknowledgment via protocol message may be delivered to node 250 (Not Illustrated). In case the demanded matching time-slot A and B are unavailable due to its pre-occupation, its non-availability is conveyed from node 251 at its end point 10 functioning in the slave mode to node 250 via a protocol message (Step 2), here, NACK signifies negative acknowledgment. Node 250, upon receiving at its end point 15 functioning in the master mode, a negative acknowledgment for the demanded matching time slots A and B, from node 251, generates and sends a successive protocol command message to add the matching time-slot C and D available at its end, for increasing the connection size to accommodate the increased bandwidth based on the received 'Indication Command' (Step 3). Node 251 receives the protocol command message successively demanding for matching time slots C and D, at its end point 10 functioning in the slave mode. If the demanded time-slots C and D are available at the node 251, an acknowledgment via protocol message is delivered to node 250 (not illustrated). If the demanded matching time slot C is available and time slot D is unavailable, node 251 acknowledges the availability of matching time slot C and negatively acknowledges (NACK) the non-availability of matching time slot D to its upstream node 250 from its end point 10 functioning in the slave mode (Step 4).

Node 250 upon receiving at its end point 15 functioning in the master mode, a positive acknowledgment for time slot C and negative acknowledgment for time slot D, from its immediate downstream node 251, generates and sends a successive protocol command message from its end point 15 functioning in the master mode, to add the matching time slot E available at its end, for compensating the deficiency of one matching time slot that is to be used for increasing the connection size to accommodate the increased bandwidth based on the received 'Indication Command' (Step 5).

Node 251 receives the protocol command message at its end point 10 functioning in the slave mode. If the demanded time-slot E is pre-occupied, the unavailability is negatively acknowledged and is delivered to node 250 (Not Illustrated). In the illustrated case, node 251 acknowledges from its end point 10 functioning in the slave mode, the availability of matching time slot E to its upstream node NE 201 (Step 6).

Node 250 receives at its end point 15 functioning in the master mode, an acknowledgment for time slot E thereby completing the process of identification of matching time slots used for the incrementing operation. Once the matching time slots are identified, ingress and egress LCR is performed between the master and slave end points of the network nodes 250 and 251 respectively by sending the NORM message. The performance of resizing in the next Resize Multi Frame (RMF) boundary by both the nodes and the subsequent initiation of bandwidth resizing (BWR) are as per existing LCR and BWR protocol as specified in ITU-T G. 7044 standards.

In case of node 250 receiving a negative acknowledgment from node 251 for the demanded time slot E, node 250 generates and sends from its end point 15 functioning in the master mode, to node 251 a successive protocol command message to add the matching time slot F available at its end (not illustrated). Several such successive demands are generated and sent to the downstream node 251 for compensating the deficiency of matching time slot that is to be used for increasing the connection size to accommodate the increased bandwidth based on the received 'Indication Command'. If all the time-slots available on node 250 are exhausted and the required number of matching time-slots could not be found, node 250 sends an ABORT message to 251 node to terminate the resizing operation (not shown in FIG. 4).

Once the link connection is successfully resized between the nodes (for eg., 250 and 251), bandwidth resizing is triggered between the nodes 250 and 251. The performance of resizing in the next Resize Multi Frame (RMF) boundary by both the nodes and the subsequent initiation of bandwidth resizing (BWR) are as per existing LCR and BWR protocol as specified in ITU-T G. 7044 standards. Upon successful completion of LCR and BWR, the node 251 triggers protocol command message at its end point 15 functioning in the master mode, for demanding the matching time slot required for the incrementing operation, to its next immediate downstream node (Step 7). The above illustrated steps from 1 to 7 are performed by the node 251 and its immediate downstream node. Upon successful ingress and egress LCR on its connection link with the node 251 and its immediate downstream node, the immediate downstream node triggers the protocol command message from its end point functioning in the master mode for demanding the matching time slot required for the incrementing operation, to its next immediate downstream node. The process comprising of steps 1 to 7 illustrated above, is performed in similar manner by each node on its connection link, in a cascading effect, such that the resizing operation till the end destination node is successful to accommodate the increased bandwidth.

Figure 5:
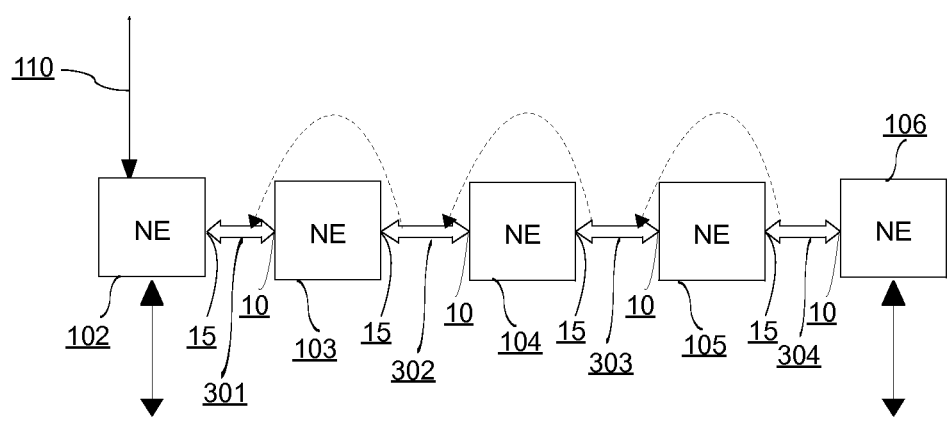
FIG. 5 represents an optical transport network structure illustrating roll back of the matching time-slots (MTS) used for the incrementing operation, in accordance with the embodiments of the invention.
Figure 6:
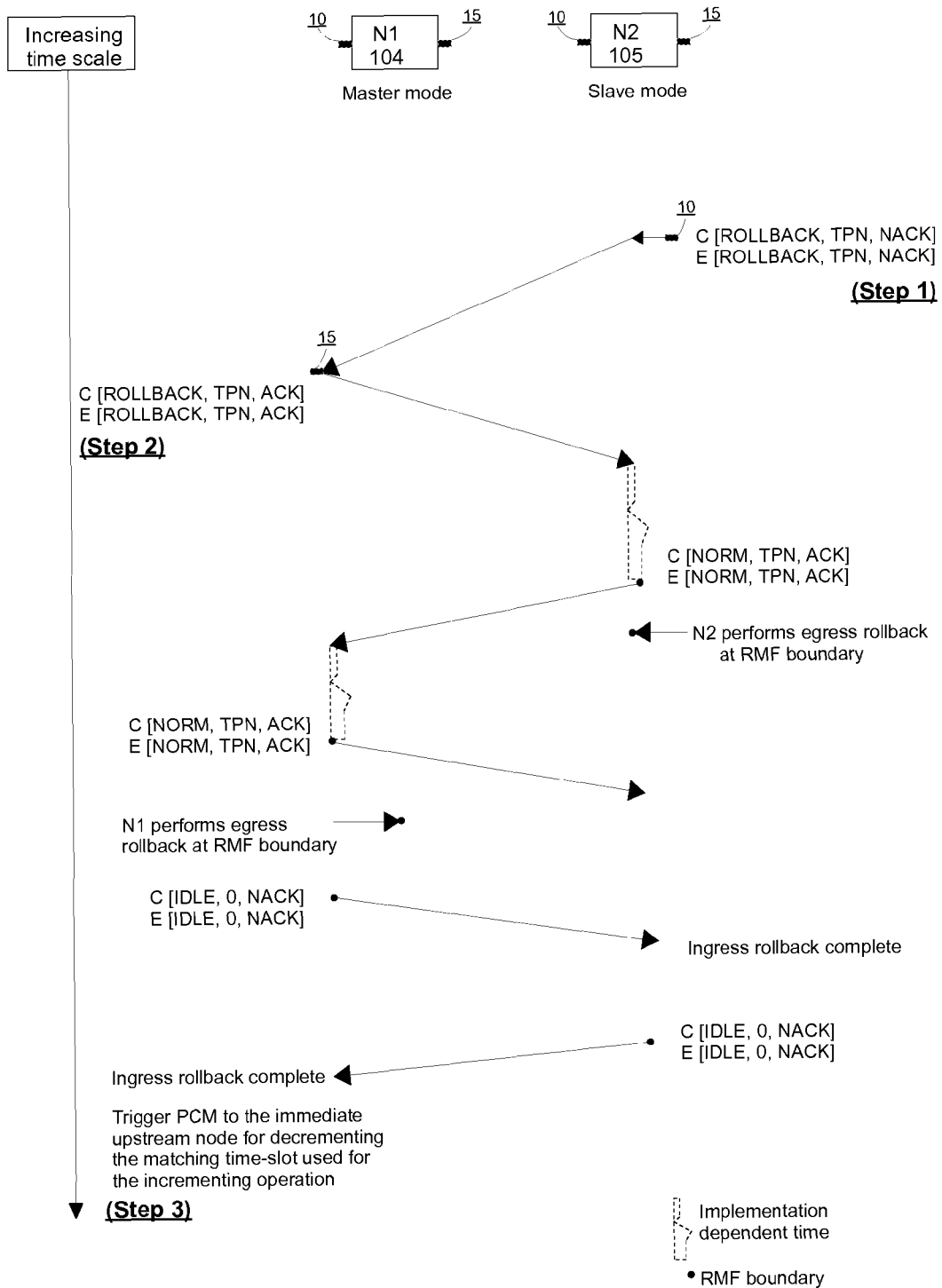
FIG. 6 represents exchange of protocol command messages (PCM) during roll back of the matching time-slots used for the incrementing operation, in accordance with the embodiments of the invention.

In case of failure on any connection link during the incrementing operation between any two intermediate nodes, or between an intermediate node and its immediate downstream destination node, where ingress and egress LCR is unsuccessful, the intermediate node initiates a protocol command message (PCM) as illustrated in FIGS. 5 and 6. As an example, an assumption can be made (as shown in FIG. 5) for any unsuccessful connection resizing on the connection link 304 between node 105 and its immediate downstream node 106. As soon as the node 105 senses that it has exhausted all its time-slots or its immediate downstream node is unresponsive, it triggers in the reverse direction, from its end point 15 functioning in the master mode to its other end point 10 functioning in the slave node, to generate and send a protocol command message (PCM) for decrementing the matching time-slot used for the incrementing operation, to its immediate upstream node.

As illustrated in FIG. 6 time-slots C and E which were used for the incrementing operation are required to be rolled back by the node 105. Hence a protocol command message [ROLLBACK] for rolling back the reserved time slot C and E is issued by node 105 from its end point 10 functioning in the slave mode to Node 104 (Step 1). Node 104 receives the message at its end point 15 functioning in the master mode and acknowledges the received protocol command by releasing time slots C and E reserved for bandwidth increase (Step 2). The acknowledgement sent by node 104 from its end point 15 functioning in the master mode is received by the node 105 at its end point 10 functioning in the slave mode. Thereafter ingress and egress LCR rollback on the connection link 303 between nodes 104 and 105 in the next Resize Multi Frame (RMF) boundary is performed.

Once the ingress and egress LCR rollback on the connection link 303 between nodes 104 and 105 is complete, exemplary features of the invention provide for the node 104 to trigger from its end point 15 functioning in the master mode to its other end point 10 functioning in the slave mode in the reverse direction, to generate and send a protocol command message for decrementing the matching time slot used for the incrementing operation, to its immediate upstream node (Step 3). The process comprising of steps 1 to 3 illustrated above, is performed in similar manner by each node on its connection link, in the reverse direction, in a cascading effect, such that the resizing operation to decrement the reserved time slot by the first upstream source node is successful.

Figure 7:
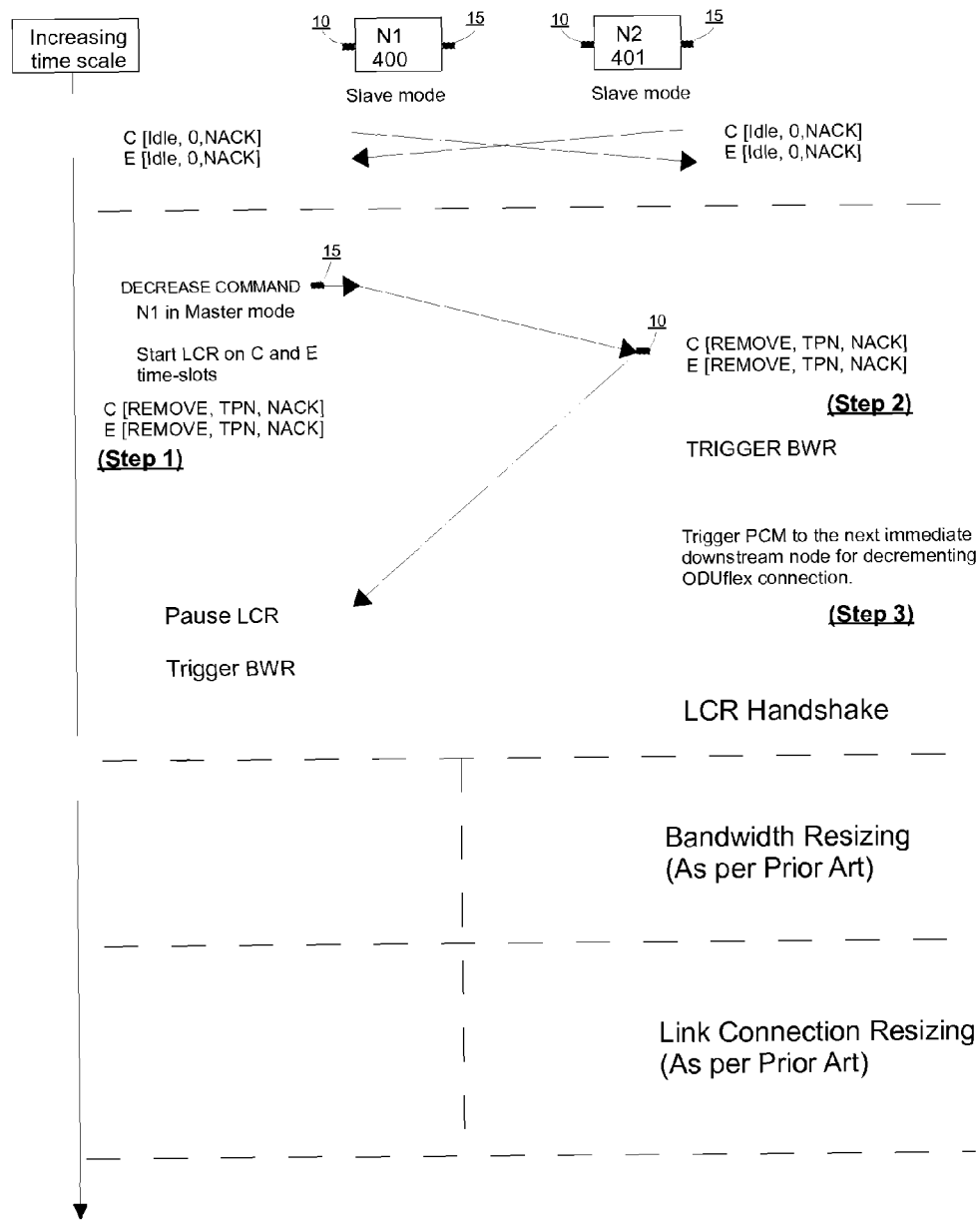
FIG. 7 shows exchange of protocol command messages (PCM) decrementing the connection link between the nodes in an ODUflex connection, in accordance with the embodiments of the invention.

FIG. 7 illustrates ODUflex connection resizing by decrementing the connection link between the nodes carrying the ODUflex circuit end to end in a network, in accordance with the embodiments of the invention. For the purposes of illustration and clarity a connection link resizing between two nodes 400 and 401 is shown. Node 401 is the immediate downstream node to node 400 and node 400 is the immediate upstream node to node 401. Based on a packet client decreased at an end node, the mechanism sensing a bandwidth decrease in the network issues an indication command to only one end node (for e.g., 400) where the packet client is decreased. As an example, if the network requires two time-slots for the decrease in bandwidth due to the decrease of packet client at the source node 400, an assumption may be made that on node 400 time-slots C and E are required to be decremented for bandwidth reduction. Without any resizing active in the network, the end points 10 and 15 of the nodes 400 and 401 both function in the slave mode. When an indication command to decrement the bandwidth is received by the node 400, the node receiving the indication command to decrement the bandwidth becomes the source node, which generates a protocol command message (PCM) from its end point 15 functioning in the master mode for removing the matching time slot C and E required for the decrementing operation, to its next immediate downstream node 401.

An illustration of protocol message exchange embodying an aspect of the invention is shown below. The node 400 from its end point 15, functioning in the master mode, sends a protocol command message (PCM) to remove the matching time-slot (MTS) C and E available at its end, for decreasing the connection size, based on the received 'indication command' to release the node resources for the decreased bandwidth (Step 1). Node 401 receives the protocol command message at its end point 10 functioning in the slave mode. A protocol acknowledgment message for removal of the demanded matching time slot is sent by the node 401 from its end point 10 functioning in the slave mode, to node 400 (Step 2). Thereafter, the pausing of LCR on the connection link between nodes 400 and 401 and the subsequent bandwidth resizing (BWR) followed by completion of the LCR by both the nodes 400 and 401 are as per LCR and BWR protocol as specified in ITU-T G. 7044 standards.

After triggering BWR on 401, the node generates and sends protocol command message at its end point 15 functioning in the master mode to remove the matching time-slot to its next immediate downstream node (Step 3). The process comprising of steps 1 to 3 illustrated above, is performed in similar manner by each node on its connection link, in a cascading effect, such that the resizing operation to decrement the connection size till the end destination node is completed.

Figure 8A:
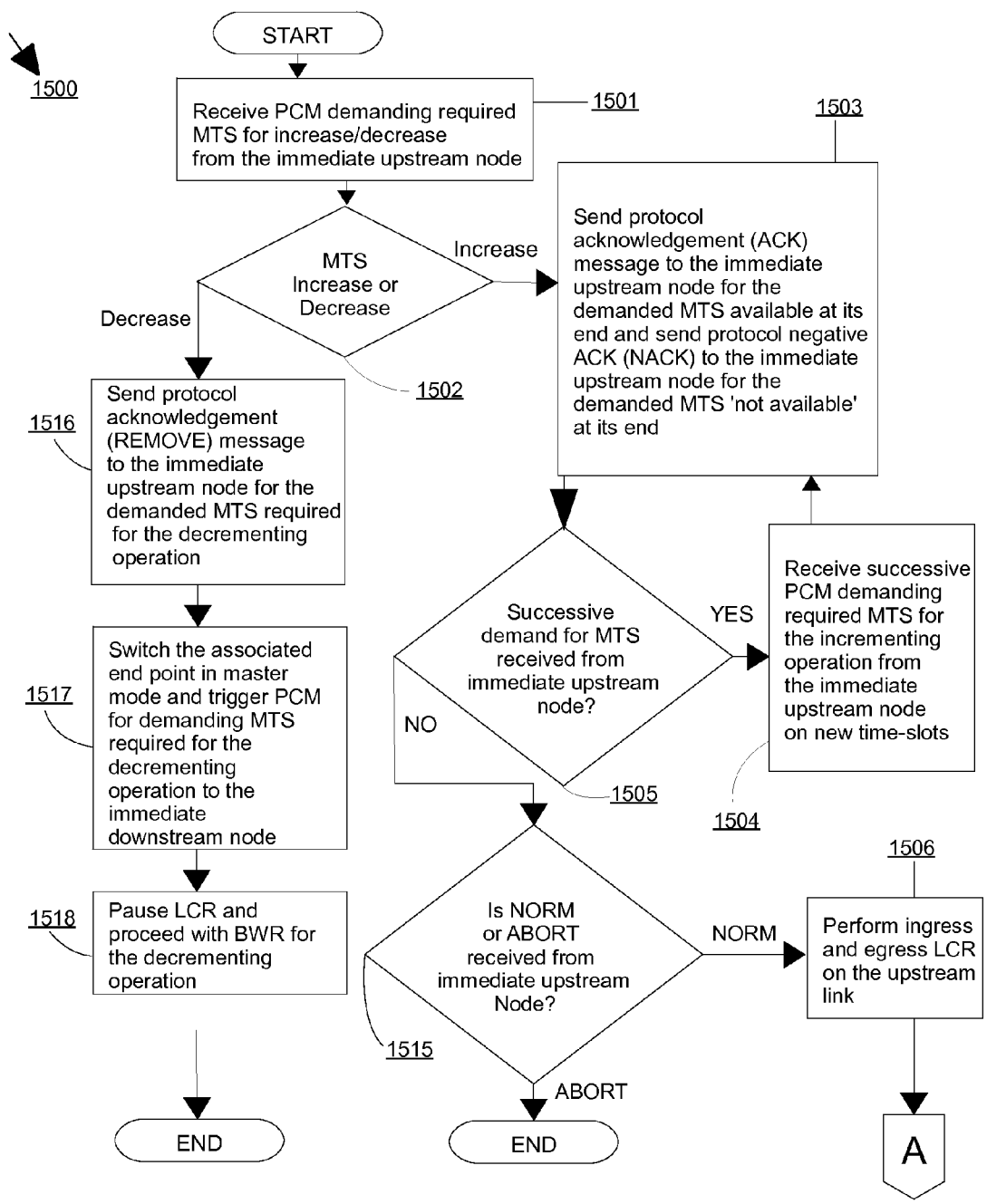
FIG. 8a is the flow chart representing the functions performed by each intermediate node carrying the ODUflex circuit end to end in a network connection, in accordance with the embodiments of the invention.

FIG. 8a is the flow chart representing the functionality 1500 performed by each intermediate node carrying the ODUflex circuit end to end in a network connection in accordance with the embodiments of the invention. The embodied functionality of each intermediate node begins at 1501, wherein it receives a protocol command message (PCM) from its immediate upstream node, at its end point functioning in slave mode.

If the intermediate node, at 1502, senses that the protocol command message (PCM) received is for demanding matching time slots (MTS) required for the incrementing operation, then at 1503, if the demanded matching time-slots are available at its end then it sends a protocol acknowledgment message (ACK) for the demanded matching time-slots from its end functioning in slave mode, to its immediate upstream node. If the demanded at least any one of the matching time-slot is unavailable, the intermediate node generates and sends a protocol negative acknowledgment (NACK) for the time-slot or time-slots that is/are unavailable to its immediate upstream node, from its end functioning in the slave mode.

Once a protocol negative acknowledgment (NACK) is received for any demanded matching time-slot, the immediate upstream node generates and sends a successive protocol command message from its end point functioning in the master mode, to add the matching time slot that may be available at its end, for compensating the deficiency of the matching time slot that is required for the incrementing operation. If such successive protocol command message is received by the intermediate node at 1505, then at 1504, the intermediate node receives such demanded successive matching time-slots at its end point functioning in the slave mode.

If the successive demanded matching time-slot or time-slots (MTS) are available at its end then at 1503 it sends a protocol acknowledgment message for the demanded matching time-slots from its end functioning in slave mode, to its immediate upstream node. Still, there arises a possibility of at least any one of the demanded successive matching time-slot being unavailable at the node's end. In such cases, once again at 1503, the intermediate node generates and sends a protocol negative acknowledgment (NACK) for the unavailable time-slot or time-slots, to its immediate upstream node, from its end functioning in the slave mode.

Upon receiving a protocol negative acknowledgment (NACK) for the successively demanded matching time-slot by the immediate upstream node, the immediate upstream node once again generates and sends a successive protocol command message from its end point functioning in the master mode, to add the matching time slot that may be available at its end, for compensating the deficiency of the matching time slot that is required for the incrementing operation. Repeated such successive demands for matching time-slot or time-slots are sent by the immediate upstream node, until the required number of matching time-slot for the incrementing operation is achieved by the immediate upstream node.

It so happens that in the process of sending such repeated successive demands for matching time-slot or time-slots by the immediate upstream node to its immediate downstream node, the immediate upstream node may exhaust all its time-slots, or there may not be any stock of time-slot required for the incrementing operation with the immediate upstream node. In such circumstances, the immediate upstream node may not issue any successive demand for matching time-slot or time-slots to its downstream node, instead it may issue a protocol command message to abort the incrementing operation.

If the intermediate node receives such ABORT protocol command at 1515, the process of incrementing operation by identifying matching time-slots is terminated. At 1506, the intermediate node upon sending protocol acknowledgment message for the demanded matching time-slots required for the incrementing operation, receives NORM command from 1515 indicating that LCR will be started at the next resize multi frame (RMF) boundary. The performance of ingress and egress LCR and the subsequent bandwidth resizing (BWR) on the connection link between the intermediate node and its immediate upstream node are as per existing LCR and BWR protocol as specified in ITU-T G. 7044 standards.

Figure 8B:
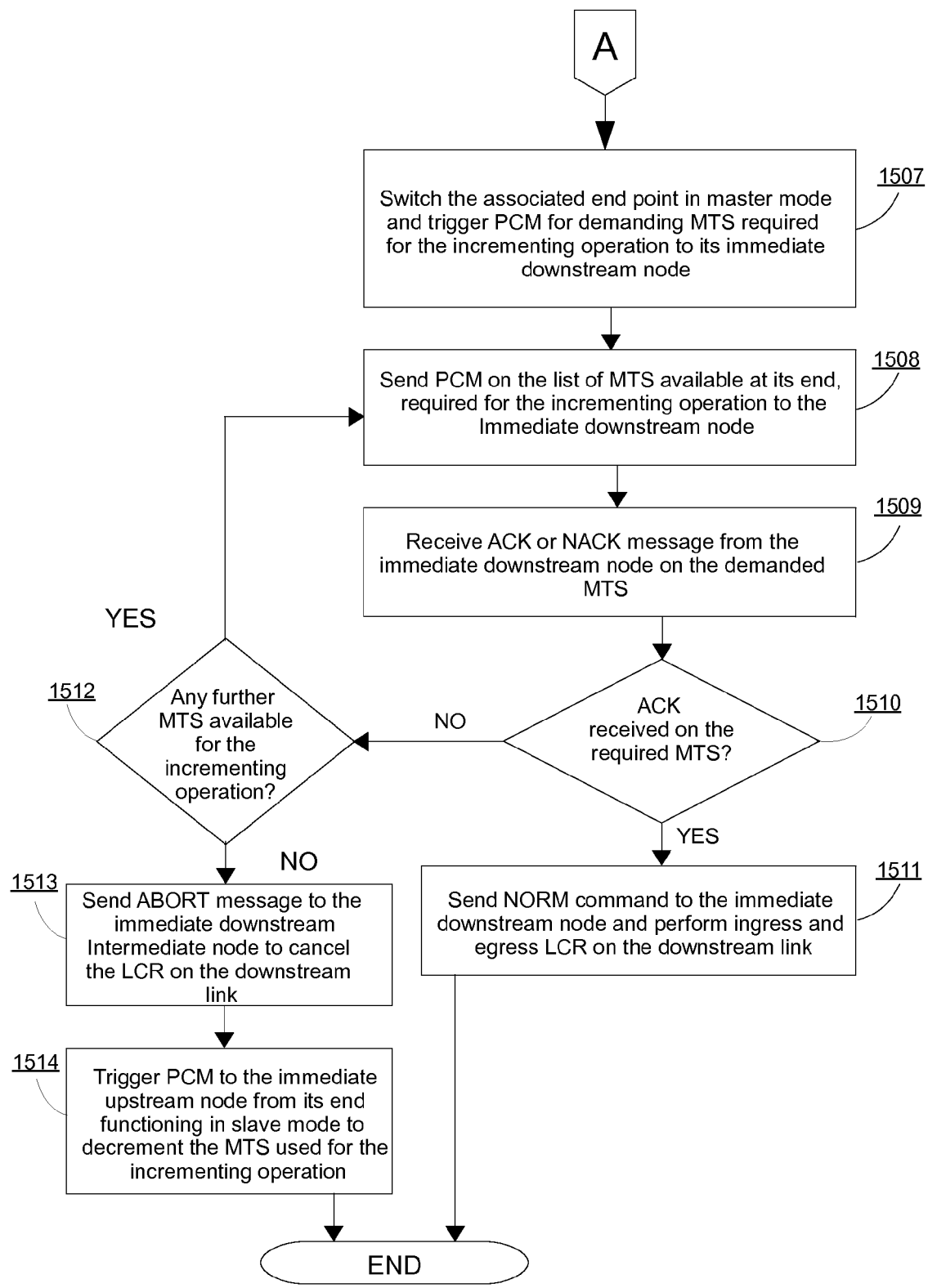
FIG. 8b is the continuation of flow chart represented in FIG. 8a, in accordance with the embodiments of the invention.

The intermediate node at 1507 (as shown in FIG. 8b) switches its associated end point in master mode and triggers the protocol command message for incrementing ODUflex connection by demanding the matching time slot required for the incrementing operation to its immediate downstream node, if the ingress and egress LCR on the connection link between the intermediate node and its immediate upstream node is successful at 1506.

Triggering the protocol command message leads to generating and sending protocol command message demanding on the list of matching time-slots available at its end, to the immediate downstream node at 1508 (as shown in FIG. 8b). At 1509, the node receives either protocol acknowledgment message or protocol negative acknowledgment message from its immediate downstream node. If protocol acknowledgment message is received at 1510 for the required number of demanded time-slots, the intermediate node sends NORM command at 1511 indicating that LCR will be started at the next resize multi frame (RMF) boundary. The performance of ingress and egress LCR and the subsequent bandwidth resizing (BWR) on the connection link between the intermediate node and its immediate upstream node are as per existing LCR and BWR protocol as specified in ITU-T G. 7044 standards.

Once the ingress and egress LCR and BWR process is complete at 1511, the immediate downstream node switches its associated end point to function in the master mode to trigger protocol command message for incrementing ODUflex connection by demanding the matching time-slot required for the incrementing operation to its downstream node (not shown in FIG. 8*b*). The above process illustrated above, is performed in similar manner by each node on its connection link, in a cascading effect, such that the resizing operation till the end destination node is successful to accommodate the increased bandwidth.

If the node at 1510 (as shown in FIG. 8*b*) receives a protocol negative acknowledgment (NACK) from its immediate downstream node, it generates and sends a successive protocol command message from its end point functioning in the master mode, to add the matching time slot that may be available at its end (at 1512), for compensating the deficiency of the matching time slot required for the incrementing operation. There arises a possibility at the immediate downstream node that at least any one of the demanded successive matching time-slot unavailable at its end. In such cases, once again at 1509, the intermediate node receives protocol negative acknowledgment for the successively demanded matching time-slot or time-slots.

Repeatedly the intermediate node generates and sends successive protocol command message from its end point functioning in the master mode, to add the matching time slot that may be available at its end, for compensating the deficiency of the matching time slot required for the incrementing operation. Repeated such successive demands for matching time-slot or time-slots are sent by the intermediate node, until the required number of matching time-slot for the incrementing operation is achieved by it. It so happens that in the process of issuing such repeated successive demands for matching time-slot or time-slots to its immediate downstream node, the intermediate node may exhaust all its time-slots, or there may not be any stock of time-slot with the node required for the incrementing operation. In such circumstances, the immediate upstream node may not issue any successive demand for matching time-slot or time-slots to its immediate downstream node, instead it may issue a protocol command message at 1513 from its end point functioning in the master mode, to abort the incrementing operation to its immediate downstream node.

If the immediate downstream node receives such ABORT protocol command, the process of incrementing operation by identifying matching time-slots is terminated. Further, certain downstream nodes may be unresponsive to any protocol command message due to system failure, crash etc., In such circumstances, the connection resizing for increasing the bandwidth becomes a failure and all the time slots reserved by the upstream nodes will be redundant.

In such circumstances either if ABORT protocol command is sent at 1513 or the intermediate node senses that its immediate downstream node is unresponsive, then at 1514 the intermediate node immediately triggers a protocol command message to its immediate upstream node, from its end point functioning in the slave mode to decrement all the matching time slot used for the incrementing operation.

If the intermediate node, at 1502 (as shown in FIG. 8*a*), senses that the protocol command message received at its end functioning in slave mode, is for demanding the matching time slot required for the decrementing operation, then at 1516 (as shown in FIG. 8*a*) it sends a protocol acknowledgment message for decrementing the demanded matching time slot, from its end functioning in slave mode, to its immediate upstream node.

After triggering BWR, the intermediate node at 1517 (as shown in FIG. 8*a*) generates and sends protocol command message at its end point 15 functioning in the master mode to remove the matching time-slot to its next immediate downstream node. The above process illustrated above, is performed in similar manner by each node on its connection link, in a cascading effect, such that the resizing operation to decrement the connection size till the end destination node is completed.

Thereafter at 1518 (as shown in FIG. 8*a*) the pausing of LCR on the connection link between the intermediate node and its immediate upstream node and the subsequent bandwidth resizing (BWR) followed by completion of the LCR by both the nodes are as per LCR and BWR protocol as specified in ITU-T G. 7044 standards.

The bit format for HAO Control (CTRL) words [IDLE], [ADD], [REMOVE], [NORM] known in the prior art is a 2 bit format as shown in FIG. 9. The HAO CTRL words in the control field 53 is carried in the LCR protocol overhead in HO OPUk (K=2,3,4) overhead row 2, column 15, bit 5 and 6. The Tributary Slot Group Status (TSGS) 55 which is used for link connection acknowledgment indication is carried in the LCR protocol overhead in HO OPUk (K=2,3,4) overhead row 2, column 15, bit 4. A reserve bit 54 is carried in the LCR protocol overhead in HO OPUk (K=2,3,4) overhead row 2, column 15, bit 3.

The bit format for the enhanced protocol command messages in accordance with the embodiments of the invention are shown in FIG. 10. The protocol command message [ABORT], used for terminating the resizing operation, is a 3 bit (101) control word. The protocol command message [ROLLBACK] used for decrementing the matching time slot used for the incrementing operation, in case of unsuccessful LCR on a connection link between nodes, is a 3 bit (100) control word. The featured embodiments of bit formats for HAO CTRL words [IDLE], [ADD], [REMOVE], [NORM] is provided with an increase from 2 bit format to 3 bit format.

Thus the addition in the bit size 57 in the Control (CTRL) field is availed by releasing the Tributary Slot Group Status bit (TSGS) 55 (as shown in FIG. 9) carried in the LCR protocol overhead in HO OPUk (K=2,3,4) overhead row 2, column 15, bit 4 to the reserve field 54 (as shown in FIG. 10) carried in the LCR protocol overhead in HO OPUk (K=2, 3,4) overhead row 2, column 15, bit 3. Thus the enhanced bit format in accordance with the embodiments of the invention for HAO CTRL words[IDLE], [ADD], [REMOVE], [NORM], [ROLLBACK], [ABORT] is carried in the LCR protocol overhead in HO OPUk (K=2,3,4) overhead row 2, column 15, bit 4,5 and 6.

Figure 11:
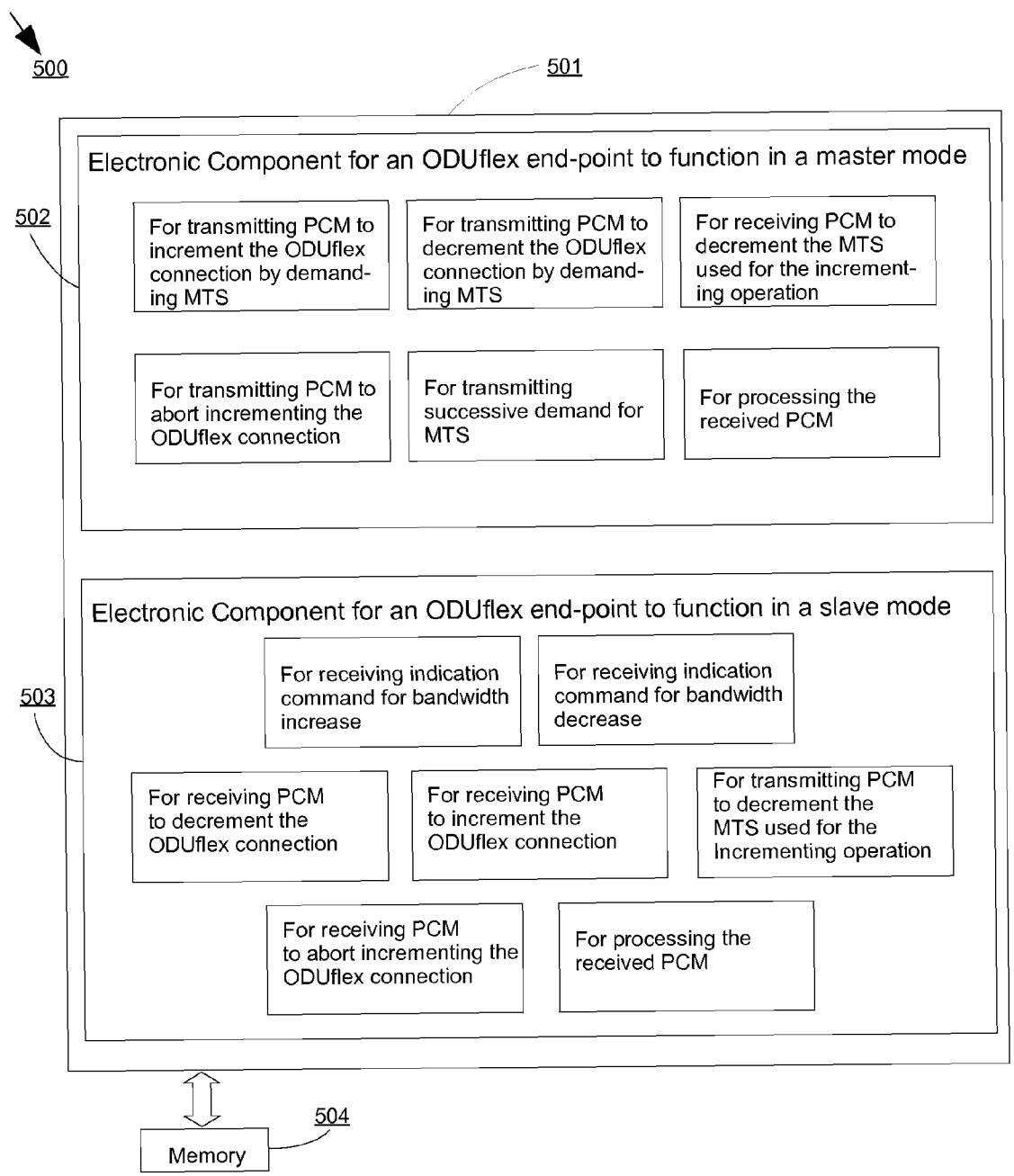
FIG. 11 illustrates a system diagram of various components and devices within the node, in accordance with the embodiments of the invention.

FIG. 11 illustrates a block diagram of an example system 500 that enables the node to function in accordance with aspects disclosed in the subject specification. System 500 can reside at least partially within a node. System 500 includes a logical grouping 501 of electronic components that can act in conjunction.

In an aspect of the subject innovation, logical grouping includes an electronic component 502, for an ODUflex end point to function in master mode: for transmitting protocol command message to increment the ODUflex connection, for transmitting protocol command message to decrement the ODUflex connection, for receiving protocol command message to decrement the matching time slot used for the incrementing operation, for transmitting protocol command message to abort incrementing the ODUflex connection, for transmitting successive demand for matching time-slot, and for processing the received protocol command messages wherein processing includes generating protocol command message to abort the incrementing operation; understanding the received protocol acknowledgment message (ACK) and the protocol negative acknowledgment message (NACK) on the availability of demanded matching time-slot and for generating appropriate protocol messages to respond; understanding the protocol command message for rolling back the matching time-slot used for the incrementing operation and for generating appropriate protocol command messages to acknowledge the same; triggering to its slave end point, to generate and send a protocol command message for decrementing the matching time-slot used for the incrementing operation, to its immediate upstream node if the ingress and egress LCR was unsuccessful in the immediate downstream link.

An electronic component 503 for an ODUflex end-point to function in a slave mode; for receiving indication command for bandwidth increase, for receiving indication command for bandwidth decrease, for receiving protocol command message to increment the ODUflex connection, for receiving protocol command message to decrement the ODUflex connection, for transmitting protocol command message to decrement the matching time-slot used for the incrementing operation, for receiving protocol command message to abort incrementing the ODUflex connection, for processing the received protocol command messages wherein, processing includes triggering its master end to generate protocol command message to increment or decrement the ODUflex connection on the downstream link; understanding the received protocol command message to increment or decrement the ODUflex connection and for generating appropriate protocol command messages to respond; checking for the availability of demanded matching time-slot at its end and for generating appropriate protocol messages to respond; understanding abort command and terminating the resizing operation; and generating protocol command message to decrement the matching time-slot used for the incrementing operation.

System 500 may also include a memory 504 that retains instructions for executing functions associated with electrical components 502, and 503, as well as measured or computed data that may be generated during executing such functions.

Memory 504 described above can be any storage device including any kind of computer readable storage media, for example, RAM, EPROM, EEPROM, flash memory, registers, hard disks, CD-ROM, DVD, etc.

Another embodiment of the invention relates to the implementation of the above described various embodiments using hardware and software. It is recognized that the various embodiments of the invention may be implemented or performed using computing devices (processors). A computing device or processor may for e.g., be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It is to be noted that respective functional blocks or elements according to above-described aspects can be implemented by any known means, either in hardware and/or software, respectively, if it is only adapted to perform the described functions of the respective parts. The mentioned method, steps can be realized in individual functional blocks or by individual devices, or one or more of the method, steps can be realized in a single functional block or by a single device.

The present invention also covers any conceivable combination of method steps and operations described above, and any conceivable combination of nodes, apparatuses, modules or elements described above, as long as the above-described concepts of methodology and structural arrangement are applicable.

It should be further noted that the individual features of the different embodiments of the invention may individually or in arbitrary combination be subject matter to another invention. It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

We claim:

1. A method of hitless ODUflex connection resizing in an optical transport network (OTN), the method comprising:
    incrementing the ODUflex connection between nodes of the OTN, according to an indication command, by identifying at least one time-slot, through link connecting resizing (LCR) protocol message exchanges, wherein identifying the at least one time slot comprises:
    receiving an indication command to increment a bandwidth at a first node,
    identifying the first node as a source node;
    generating, by the source node to a second node, a first protocol command message (PCM) demanding a first time-slot, wherein the second node is a next intermediate downstream node in the OTN,
    receiving, from the second node, a first acknowledgement message comprising a response to the first PCM;
    determining, from the received acknowledgement message, whether the demanded first time slot is available with the second node,
    sending, in response to determining that the first time slot is not available with the second node, a second PCM to the second node demanding a second time-slot,
    receiving, from the second node, a second acknowledgement message comprising the response to the second PCM;
    determining, from the second acknowledgement message, whether the demanded second time slot is available with the second node, and
    identifying, in response to determining that the second time slot is available with the second node, the second time slot as the at least one time slot;

performing, based on the identified time slot, ingress and egress LCR between the first node and the second node, determining whether the second nod is a destination node in the OTN, identifying, in response to determining that the second node is not the destination node, a third node, wherein the third node is the next downstream node to the second node in the OTN; and identifying by the second node, the at least one time slot through link connecting the second node and the third node.

2. A system comprising a source node, a destination node and an intermediate node, facilitating an ODUflex connection resizing in an optical transport network, each node comprising of:

an electronic component for an ODUflex end-point to function in a master mode; for transmitting protocol command message to increment the ODUflex connection, for transmitting protocol command message to decrement the ODUflex connection, for receiving protocol command message to decrement the matching time slot used for the incrementing operation, for transmitting protocol command message to abort incrementing the ODUflex connection, for transmitting successive demand for matching time-slot, for processing the received protocol command message;

an electronic component for an ODUflex end-point to function in a slave mode; for receiving an indication command for bandwidth increase, for receiving an indication command for bandwidth decrease, for receiving protocol command message to increment the ODUflex connection, for receiving protocol command message to decrement the ODUflex connection, for transmitting protocol command message to decrement the matching time-slot used for the incrementing operation, for receiving protocol command message to abort incrementing the ODUflex connection, for processing the received protocol command messages; and a memory for retaining instructions for executing functions associated with the receiver, processors, and transmitter and as well as measured or computed data that may be generated during executing such functions.

3. A optical transport network (OTN) comprising:

a first node, wherein the first node is configured to:

receive an indication command to increment a bandwidth at the first node, generate a first protocol command message (PCM) to a second node demanding a first time-slot, wherein the second node is a next intermediate downstream node to the first node in the OTN, receive, from the second node, a first acknowledgement message comprising a response to the first PCM, determine, from the received acknowledgement message, whether the demanded first time slot is available with the second node, send, in response to determining that the first time slot is not available with the second node, a second PCM to the second node demanding a second time-slot, receive, from the second node, a second acknowledgement message comprising the response to the second PCM, determine, from the second acknowledgement message, whether the demanded second time slot is available with the second node, and perform, based on the identified time slot, ingress and egress LCR between the first node and the second node, wherein the system is configured to:

determine whether the second node is a destination node in the OTN, and identify, in response to determining that the second node is not the destination node, a third node, wherein the third node is the next downstream node to the second node in the OTN; and wherein the second node is configure to identify the at least one time slot through link connecting the second node and the third node.

4. The system of claim 3, wherein the first node is configured to send successive PCM messages to the second node until the at least one time is identified.

* * * * *